US012234683B2

(12) United States Patent
Choi et al.

(10) Patent No.: US 12,234,683 B2
(45) Date of Patent: Feb. 25, 2025

(54) DOOR AND HOME APPLIANCE HAVING THE SAME

(71) Applicant: Samsung Electronics Co., Ltd., Suwon-si (KR)

(72) Inventors: Cheoleun Choi, Suwon-si (KR); Sihwan Kim, Suwon-si (KR); Hongman Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 17/037,610

(22) Filed: Sep. 29, 2020

(65) Prior Publication Data

US 2021/0131171 A1 May 6, 2021

(30) Foreign Application Priority Data

Oct. 30, 2019 (KR) ........................ 10-2019-0136274

(51) Int. Cl.

*E06B 3/968* (2006.01)
*E06B 3/82* (2006.01)
*E06B 3/88* (2006.01)
*E06B 3/964* (2006.01)
*F24C 15/02* (2006.01)

(52) U.S. Cl.

CPC .............. *E06B 3/968* (2013.01); *E06B 3/827* (2013.01); *E06B 3/88* (2013.01); *E06B 3/9641* (2013.01); *F24C 15/028* (2013.01)

(58) Field of Classification Search

CPC . E06B 3/968; E06B 3/827; E06B 3/88; E06B 3/9641; E06B 3/5885; E06B 2003/6291; F24C 15/028

USPC .......................................................... 126/190

See application file for complete search history.

(56) References Cited

U.S. PATENT DOCUMENTS 1,829,948 A * 11/1931 Sherman ................. F24C 15/02 126/190
4,196,952 A 4/1980 Crowe
(Continued)

FOREIGN PATENT DOCUMENTS

CN 204718256 U 10/2015
DE 102011107589 A1 * 1/2013 ........... E06B 3/9641
(Continued)

OTHER PUBLICATIONS

Supplementary European Search Report dated Jul. 22, 2022 in connection with European Patent Application No. 20 88 3461, 7 pages.

(Continued)

*Primary Examiner* — Allen R. B. Schult
*Assistant Examiner* — William C Weinert

(57) ABSTRACT

A door and a home appliance having the same. The home appliance includes a main body including a chamber and a door configured to open or close the chamber, wherein the door includes a front panel, a plurality of flanges formed from the front panel in a bent shape, an incision portion between the plurality of flanges, a fixing member coupled to the plurality of flanges to prevent the door from being deformed, and a cover member configured to cover the incision portion and the fixing member. The cover member includes a corner cover portion and a rear cover portion.

16 Claims, 10 Drawing Sheets

(56) References Cited

U.S. PATENT DOCUMENTS

| | | | | |
|---|---|---|---|---|
| 8,028,489 | B1 * | 10/2011 | Lawrence | E06B 3/9641 52/204.58 |
| 9,151,505 | B2 | 10/2015 | Kim et al. | |
| 9,388,990 | B2 * | 7/2016 | Kim | F24C 15/02 |
| 2011/0089721 | A1 * | 4/2011 | Mihalic | E06B 3/9641 296/201 |
| 2012/0311847 | A1 * | 12/2012 | Falconer | F16B 12/46 403/402 |
| 2016/0353938 | A1 * | 12/2016 | Wei | A47K 3/34 |
| 2018/0128039 | A1 * | 5/2018 | Rafter | E06B 5/12 |
| 2020/0256115 | A1 * | 8/2020 | Vitello | E06B 9/15 |
| 2022/0081961 | A1 * | 3/2022 | Özden | E04D 13/0315 |

FOREIGN PATENT DOCUMENTS

| | | | | |
|---|---|---|---|---|
| JP | 2000054743 | A | * | 2/2000 |
| JP | 2004003165 | A | | 1/2004 |
| JP | 2008308843 | A | * | 12/2008 |
| KR | 10-2010-0052736 | A | | 5/2010 |
| KR | 20-2013-0003439 | U | | 6/2013 |
| KR | 20180133296 | A | * | 6/2017 |
| KR | 10-2018-0133296 | A | | 12/2018 |

OTHER PUBLICATIONS

International Search Report of the International Searching Authority in connection with International Application No. PCT/KR2020/012105 dated Jan. 12, 2021, 3 pages.

Communication pursuant to Article 94(3) EPC dated Aug. 16, 2023, in connection with European Application No. 20883461.4, 6 pages.

* cited by examiner

DOOR AND HOME APPLIANCE HAVING THE SAME

CROSS-REFERENCE TO RELATED APPLICATION

This application is based on and claims priority under 35 U.S.C. § 119 to Korean Patent Application No. 10-2019-0136274 filed on Oct. 30, 2019 in the Korean Intellectual Property Office, the disclosure of which is incorporated herein by reference.

BACKGROUND

1. Field

The disclosure relates to a door having an improved corner structure and a home appliance having the same.

2. Description of the Related Art

A home appliance includes a chamber that implements a function of a device, such as a cooking room or a washing room, and a door that opens and closes the chamber.

The door includes a chassis forming the external appearance thereof, glass, and an inner frame. The chassis is composed of a single panel that is bent at upper, lower, left, and right sides to form the external appearance of the door. In this case, a corner portion of the chassis is cut out for bending. A user may be injured by a sharp shear surface formed at the corner portion.

In order to prevent a user from being injured by the sharp shear surface, the conventional technology uses a structure in which a corner portion having a shear surface is welded or an incision is formed in other portions rather than a corner portion and covered with a cap.

However, such a welding requires a complicated process, causing a difficulty in securing a certain quality. In addition, without forming the incision on the corner portion, the corner portion is formed to have an edge with a small radius, thereby causing the surface to be uneven.

In addition, when the cap and the chassis are fixed to each other with a fastening member in order to prevent the panel from being separated, a stress may directly act on the cap, and the durability of the cap may be deteriorated.

SUMMARY

Therefore, it is an object of the disclosure to provide a door including a cover member that covers a sharp corner portion of the door through a simple structure, and a home appliance having the same.

Therefore, it is an object of the disclosure to provide a door including a cover member capable of providing the door with stylish edge, and a home appliance having the same.

Therefore, it is an object of the disclosure to provide a door having an improved structure to minimize a stress acting on a cover member, and a home appliance having the same.

Additional aspects of the disclosure will be set forth in part in the description which follows and, in part, will be obvious from the description, or may be learned by practice of the disclosure.

Therefore, it is an aspect of the disclosure to provide a home appliance including: a main body including a chamber; and a door configured to open or close the chamber, wherein the door includes: a front panel; a plurality of flanges formed from the front panel in a bent shape; an incision portion between the plurality of flanges; a fixing member coupled to the plurality of flanges to prevent the door from being deformed; and a cover member configured to cover the incision portion and the fixing member.

The plurality of flanges may include: a first upper flange formed from the front panel in a bent shape to form an upper surface of the door; a first side flange formed from the front panel in a bent shape to form a side surface of the door; a second upper flange formed from the first upper flange in a bent shape to form a part of a rear surface of the door; and a second side flange formed from the front side flange in a bent shape to form a part of the rear surface of the door.

The fixing member may be coupled to the second upper flange and the second side flange.

The incision portion may include: a first incision portion formed between the first upper flange and the first side flange; and a second incision portion formed between the second upper flange and the second side flange.

The cover member may include: a corner cover portion provided to cover the first incision portion; and a rear cover portion provided to cover the second incision portion and the fixing member.

The corner cover portion may include: a first protrusion configured to interfere with an inner surface of the first upper flange; and a second protrusion configured to interfere with an inner surface of the first side flange.

The corner cover portion may have an outer surface that protrudes beyond an outer surface of the first upper flange and the first side flange.

The cover member may further include a reinforcing rib formed at a connecting portion between the corner cover portion and the rear cover portion to support the corner cover portion and the rear cover portion.

The rear cover portion may include a coupling protrusion formed to be inserted into the second side flange, and the second side flange may further include a coupling hole formed at a position corresponding to the coupling protrusion.

The rear cover portion may be bonded to parts of the second upper flange and the second side flange.

The cover member may include an accommodating space in which the fixing member is accommodated.

The fixing member may include steel material, and the cover member may include synthetic resin material.

Some of the plurality of flanges may include a plurality of insertion holes into which the fixing member is inserted.

The fixing member may include: a body formed with a fastening hole; and a plurality of extending portions extending in a direction perpendicular to the body so as to be inserted into the plurality of insertion holes.

The fastening hole may include a first fastening hole, and one of the plurality of flanges further may include a second fastening hole at a position corresponding to the first fastening hole.

It is another aspect of the disclosure to provide a door used for a home appliance, the door including: a chassis forming a front surface, an upper surface, a side surface, and a part of a rear surface of the door; an incision portion formed by cutting a corner of the chassis; a cover member configured to cover the incision portion to prevent the incision portion from being exposed; and a fixing member covered by the cover member and coupled to the part of the rear surface, the fixing member including material having a rigidity greater than a rigidity of the cover member.

The fixing member may include: a body having a fastening hole allowing the fixing member to be fastened to the part of the rear surface; and a plurality of extending portions extending in a direction perpendicular to the body and inserted into the part of the rear surface.

The incision portion may include: a first incision portion formed between the upper surface and the side surface; and a second incision portion formed between a part of the rear surface formed from the upper surface in a bent shape and a part of the rear surface formed from the side surface in a bent shape, wherein the cover member includes: a corner cover portion seated on the first incision portion; and a rear cover portion attached to the parts of the rear surface to cover the second incision portion and the fixing member.

It is another aspect of the disclosure to provide a door used for a home appliance, the door including: a panel; a first flange formed from the panel in a bent shape to form a first surface of the door; a first side flange formed from the panel in a bent shape to form a side surface of the door; a second flange formed from the first flange in a bent shape to face the panel; a second side flange formed from the first side flange in a bent shape to face the panel; an incision portion formed by cutting a corner side for the panel to be bent; a fixing member inserted into the second flange and the second side flange to prevent the door from being deformed; and a cover member configured to cover the incision portion and the fixing member.

The fixing member may include material having a rigidity greater than a rigidity of the cover member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
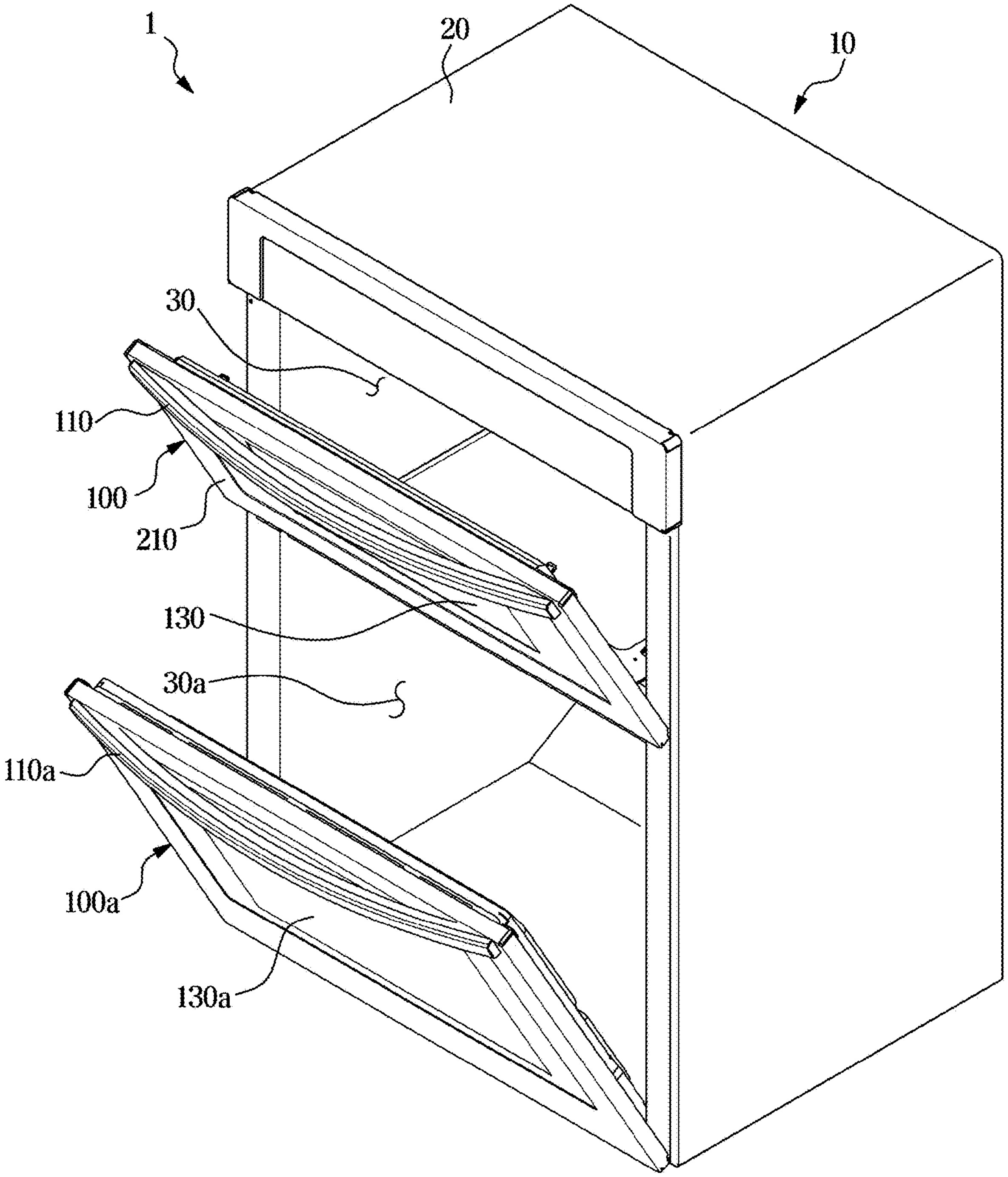
FIG. 1 is a perspective view illustrating a home appliance according to an embodiment of the disclosure.

FIGS. 1 through 7D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the present disclosure are only the most preferred embodiments, and it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first", "second", etc., may be used herein to describe various elements, these elements should not be limited by these terms. The above terms are used only to distinguish one component from another.

For example, a first component discussed below could be termed a second component, and similarly, the second component may be termed the first component without departing from the teachings of this disclosure. As used herein, the term "and/or" includes any and all combinations of one or more of the associated listed items.

The terms "front", "rear", "upper", "lower", "top", and "bottom" as herein used are defined with respect to the drawings, but the terms may not restrict the shape and position of the respective components.

Hereinafter, an embodiment according to the disclosure will be described in detail with reference to the accompanying drawings.

FIG. 1 is a perspective view illustrating a home appliance according to an embodiment of the disclosure. The following description may assume that the home appliance is an oven, but the home appliance according to the disclosure may be variously provided without limitation as long as it can include a door.

Referring to FIG. 1, an oven 1 may include a main body 10 including an inner case and an outer case 20. A plurality of chambers 30 and 30*a* may be formed in the inner case. The outer case 20 is coupled to the outside of the inner case to form the external appearance of the oven 1. The inner case and the outer case 20 may each have a substantially box shape with an open front.

The plurality of chambers 30 and 30*a* may include a first chamber 30 and a second chamber 30*a*. The first chamber 30 may be formed on the second chamber 30*a*. The plurality of chambers 30 and 30*a* may be used as a cooking room. In addition, the plurality of chambers 30 and 30*a* may be used for various uses, such as storing food.

The oven 1 may include a plurality of doors 100 and 100*a* provided on a front side of the main body 10 to open and close the plurality of chambers 30 and 30*a*, respectively. The plurality of doors 100 and 100*a* may include a first door 100 that opens and closes the first chamber 30 and a second door 100*a* that opens and closes the second chamber 30*a*.

The first door 100 may include a first front glass 130 through which the inside of the oven 1 is viewed from the outside. The second door 100*a* may also include a second front glass 130*a*.

The first door 100 may have a first door handle 110 at an upper portion of a front surface thereof to be gripped by a user so that the first door 100 opens and closes the first chamber 30. The second door 100*a* may also have a second door handle 110*a* at an upper portion of a front surface thereof to be gripped by a user so that the second door 100*a* may open and close the second chamber 30*a*.

Various parts constituting the oven 1 may be included in a space between the inner case in which the plurality of chambers 30 and 30*a* are formed and the outer case 20 forming the external appearance of the oven 1. In addition, a machine room may be provided to accommodate machine parts that control the operation of various accessories.

In FIG. 1, the oven 1 has been illustrated as including a plurality of doors 100 and 100*a* and a plurality chambers 30 and 30*a*, but the number of the door 100 and the chamber is not limited thereto, the concept of the disclosure may be applied to an oven having a single door 100 and a single chamber.

Figure 2:
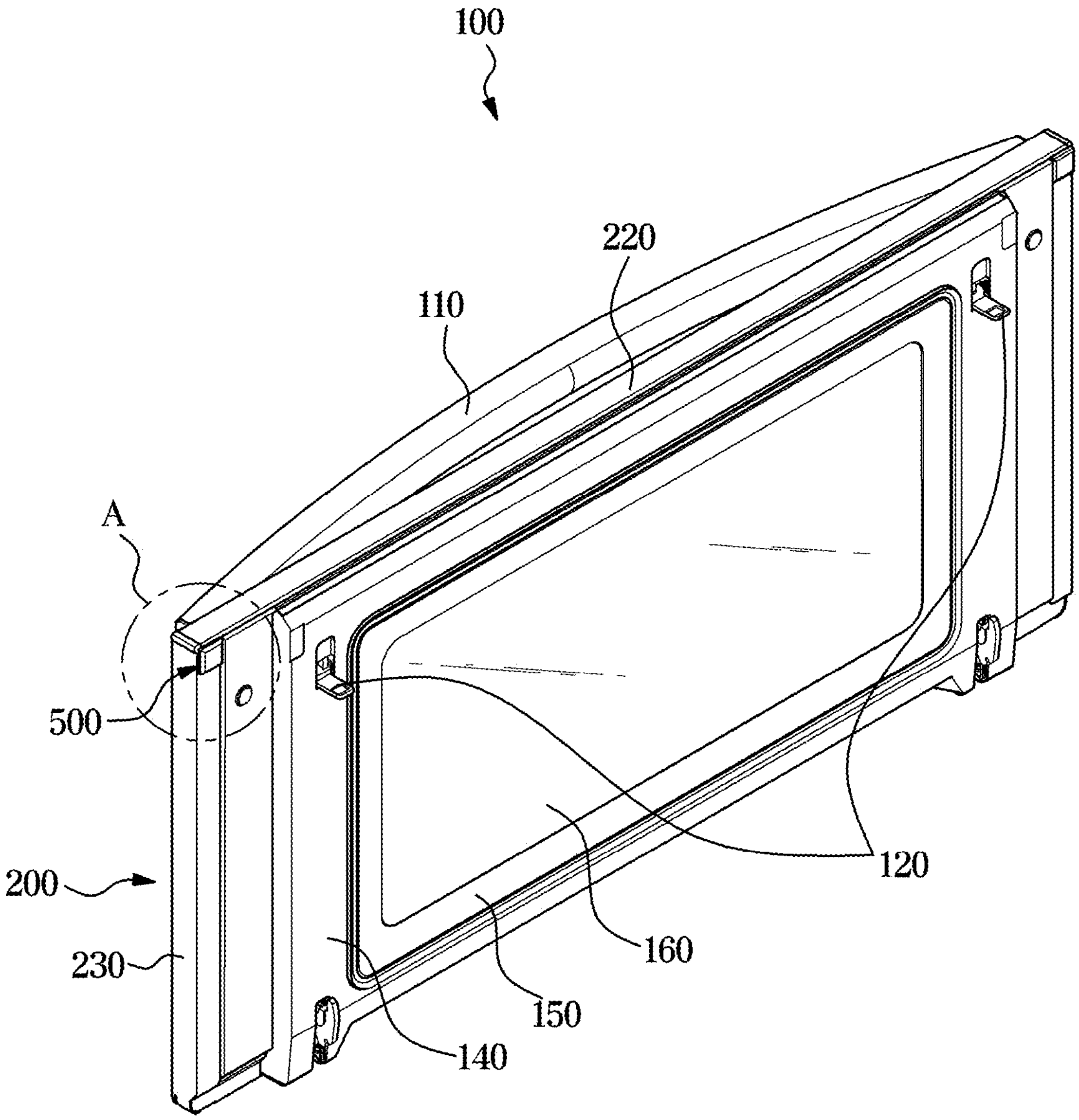
FIG. 2 is a rear side perspective view illustrating a first door of a home appliance according to an embodiment of the disclosure.

FIG. 2 is a rear side perspective view illustrating the first door 100 of a home appliance according to an embodiment of the disclosure.

Referring to FIGS. 1 and 2, the first door 100 (hereinafter, referred to as a door) may include a chassis 200 that forms the external appearance of the door 100. The chassis 200 may include a front panel 210 forming the front surface of the door 100. The chassis 200 may be provided in a substantially box shape by bending edges of the front panel 210. The detailed structure of the chassis 200 will be described below.

Referring to FIG. 2, the door 100 may include a rear glass 160 and a fixing frame 150 for fixing the rear glass 160. The rear glass 160 may be accommodated inside the fixed frame 150. In addition, the rear glass 160 may be disposed to seal the first chamber 30.

The door 100 may include a rear panel 140. The rear panel 140 may be mounted on the rear of the door 100 to form a part of a rear surface of the door 100. The rear panel 140 may cover other components included in the door 100 to neatly form the rear appearance of the door 100.

The door 100 may include a plurality of locking devices 120. The plurality of locking devices 120 may be provided on the door 100 so that the door 100 is fixed to and unfixed from the main body 10. The plurality of locking devices 120 may be accommodated at an inside of the rear panel 140. In FIG. 2, the locking device 120 is provided in a plural, but the number of the locking device 120 is not limited thereto, and the door 100 may include a single locking device 120.

The door 100 may include a cover member 500 at a corner. The cover member 500 may be attached to the chassis 200 to cover a sharp cut surface of the chassis 200 of the door 100. With such a configuration, the user is prevented from being injured by the cut surface of the chassis 200. Detailed configuration related to a corner of the door 100 will be described below.

The following description is made in relation to the first door 100 as an example with reference to FIGS. 2 to 7D, but the same configuration may be applied to the second door 100*a*.

Figure 3:
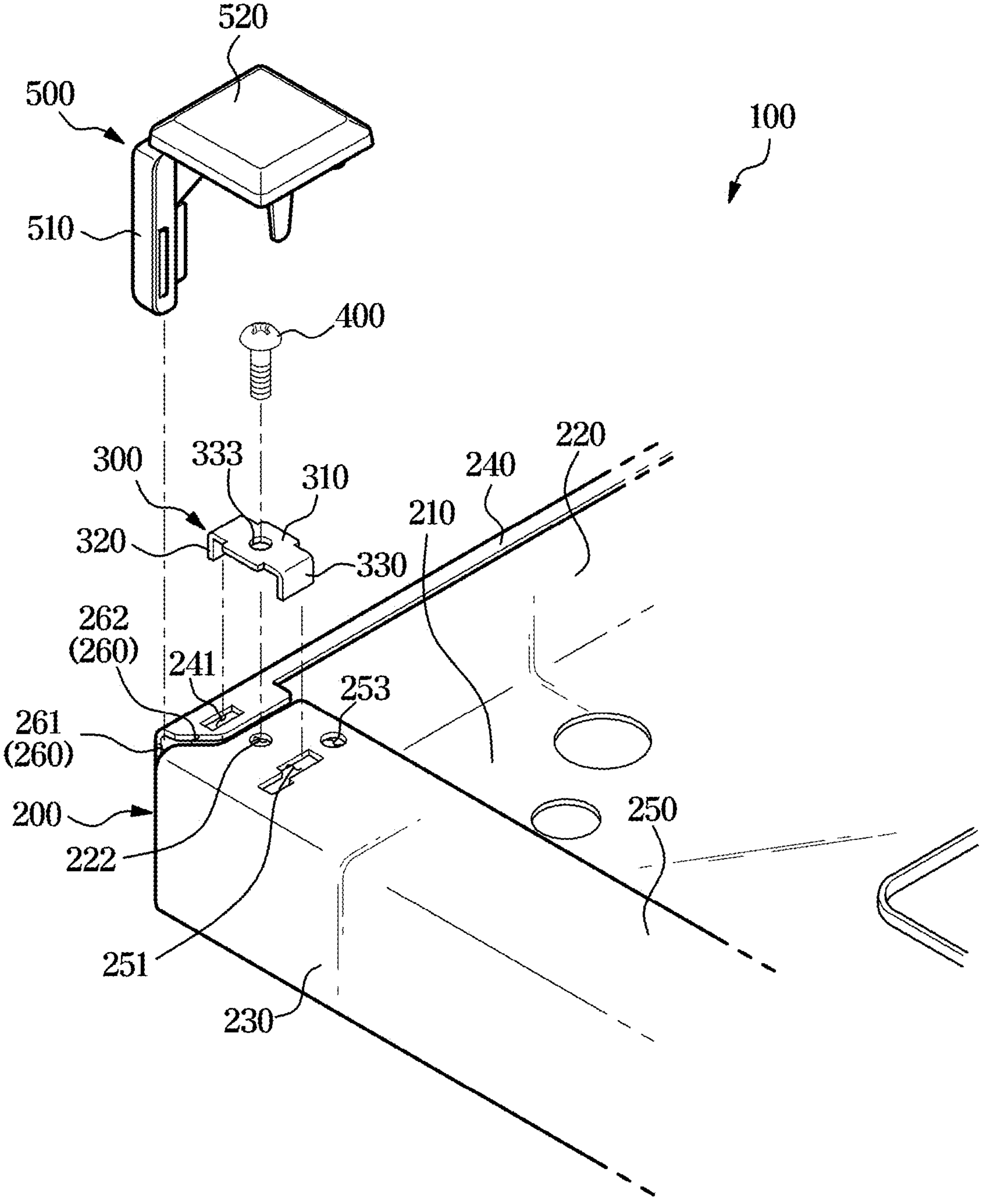
FIG. 3 is an enlarged perspective view illustrating part A of FIG. 2, in which some components of a door are disassembled.

FIG. 3 is an enlarged perspective view illustrating part A of FIG. 2, in which some components of the door 100 are disassembled.

Referring to FIGS. 2 and 3, the door 100 may include the chassis 200 that forms a front surface, an upper surface, a lower surface, a side surface, and a part of a rear surface of the door 100.

The chassis 200 may include the front panel 210 forming the front surface of the door 100. The front panel 210 may be composed of a single panel. The chassis 200 210 may be formed in a partially open box shape by bending edges of the front panel 210.

The chassis 200 may include a plurality of flanges formed from the front panel 210 in a bent shape. The chassis 200 may include a first upper flange 220 formed by bending an upper side of the front panel 210 to form the upper surface of the door 100. The first upper flange 220 may be bent in an inward direction of the door 100. The inward direction may be a direction toward the chamber 30 of the oven 1. The chassis 200 may include a second upper flange 240 that is formed by bending the first upper flange 220 in the inward direction of the door 100 to form a part of the rear surface of the door 100. The front panel 210 may be provided substantially perpendicular to the first upper flange 220, and the first upper flange 220 may be provided substantially perpendicular to the second upper flange 240.

The chassis 200 may include a first side flange 230 that is formed by bending a lateral side of the front panel 210 to form the side surface of the door 100. The first side flange 230 may be bent in the inward direction of the door 100. The chassis 200 may include a second side flange 250 that is formed by bending the first side flange 230 in the inward direction of the door 100 to form a part of the rear surface of the door 100. The front panel 210 may be provided substantially perpendicular to the first side flange 230, and the first side flange 230 may be provided substantially perpendicular to the second side flange 250.

The chassis 200 may include an incision portion 260 formed by cutting the chassis 200 for bending the front panel 210. The incision portion 260 may be formed at a corner side of the chassis 200.

The incision portion 260 may include a first incision portion 261 formed between the first upper flange 220 and the first side flange 230. The incision portion 260 may include a second incision portion 262 formed between the second upper flange 240 and the second side flange 250.

The second upper flange 240 and the second side flange 250 formed by bending the front panel 210 may be provided on the same plane. The second upper flange 240 and the second side flange 250 may form parts of the rear surface of the door 100. The second upper flange 240 and the second side flange 250 may include respective insertion holes 241 and 251 into which a fixing member 300 is inserted. In addition, the second side flange 250 may include a coupling hole 253 into which the cover member 500 is inserted.

The door 100 may include the fixing member 300 coupled to the chassis 200 to hold the front panel 210 in a bent shape. Specifically, the fixing member 300 may be inserted into and fixed to the second upper flange 240 and the second side flange 250.

The fixing member 300 may include a body 310. The body 310 may be provided in parallel with the second upper flange 240 and the second side flange 250 while in close contact with the second upper flange 240 and the second side flange 250. The body 310 may be formed with a first fastening hole 333 so that the fixing member 300 is coupled to the second side flange 250.

The fixing member 300 may include a plurality of extending portions extending in a direction perpendicular to the body 310 so as to be inserted into the respective insertion holes of the second upper flange 240 and the second side flange 250. The plurality of extending portions may include a first extending portion 320 inserted into the insertion hole 241 of the second upper flange 240 and a second extending portion 330 inserted into the insertion hole 251 of the second side flange 250.

The second side flange 250 may include a second fastening hole 222 at a position corresponding to the first fastening hole 333 of the fixing member 300. A coupling member 400 may pass through the first fastening hole 333 and the second fastening hole 222 to securely couple the fixing member 300 to the chassis 200. The coupling member 400 may include a screw. However, the disclosure is not limited thereto, and the coupling member may be provided as a rivet, or may be variously provided using any member for coupling.

The fixing member 300 may include a steel material on which pressing is performable.

The door 100 may include the cover member 500 provided to cover the incision portion 260 of the chassis 200, the fixing member 300, and the coupling member 400. The cover member 500 may include a corner cover portion 510 and a rear cover portion 520.

The corner cover portion 510 may be provided to cover the first incision portion 261. The corner cover portion 510 may be formed to extend in the thickness direction of the door 100 to correspond to the shape of the first incision portion 261 to be seated in the first incision portion 261.

The rear cover portion 520 may be provided to cover the second incision portion 262 and the fixing member 300. In addition, the rear cover portion 520 may be provided to cover the coupling member 400 coupled to the fixing member 300. The detailed shape of the cover member 500 will be described below.

In FIG. 3, the door 100 has been illustrated as having a corner in which the front panel 210 is bent into a plurality of flanges forming parts of each of the upper surface, the side surface, and the rear surface of the door. However, the disclosure is not limited thereto, and the front panel 210 may be bent to form the lower surface of the door 100, and the corner of the door 100 may be formed at a different position.

Figure 4:
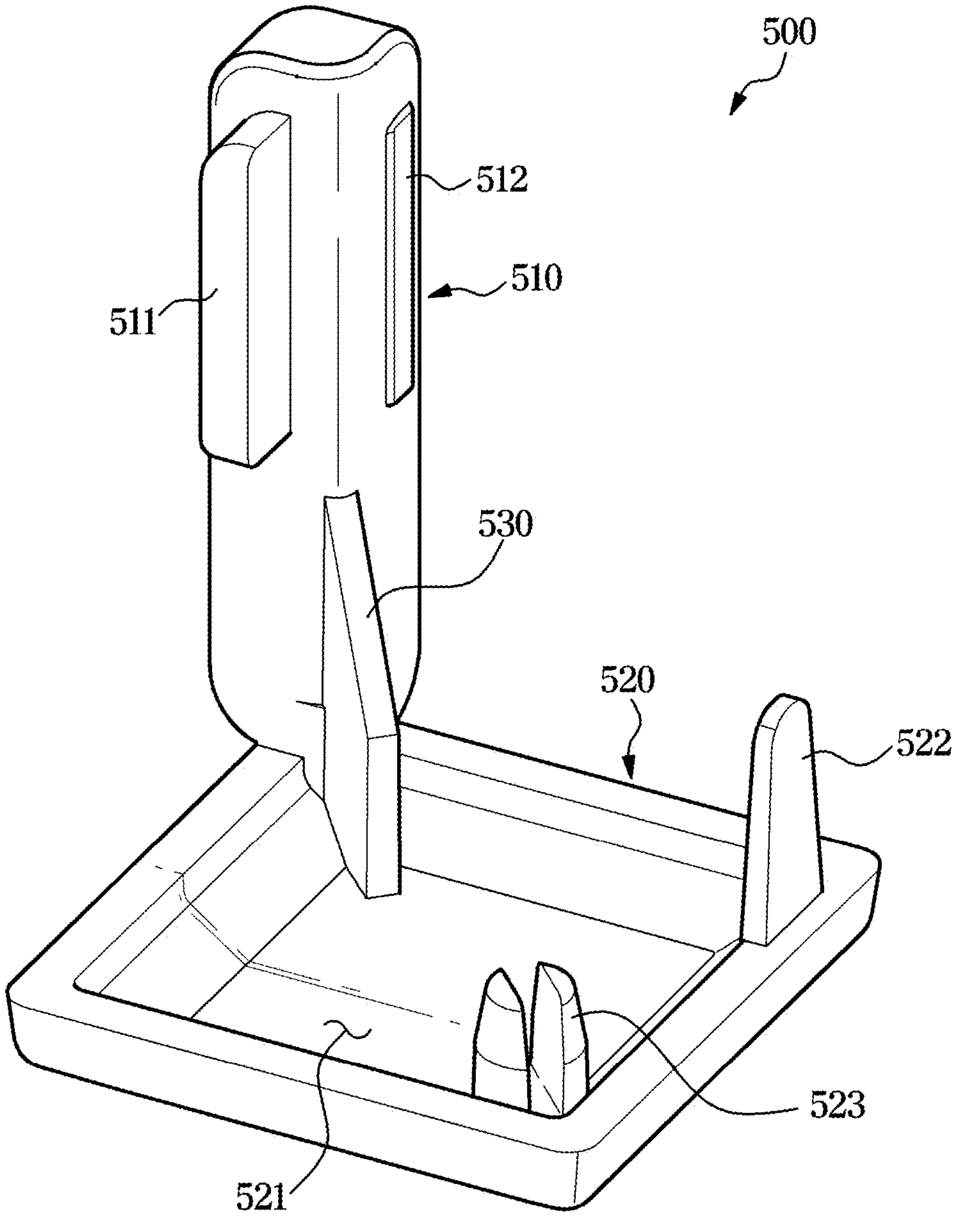
FIG. 4 is a rear side perspective view illustrating a cover member of a door according to an embodiment of the disclosure.

FIG. 4 is a rear side perspective view illustrating the cover member 500 according to the embodiment of the disclosure.

Referring to FIGS. 3 and 4, the cover member 500 includes the corner cover portion 510 provided to cover the first incision portion 261 and the rear cover portion 520 provided to cover the second incision portion 262.

The corner cover portion 510 may be seated on the first incision portion 261 to cover a sharp shear surface of the chassis 200. The corner cover portion 510 may form the corner of the door 100.

The corner cover portion 510 may include a first protrusion 511 that protrudes to interfere with an inner surface of the first upper flange 220. The corner cover portion 510 may include a second protrusion 512 that protrudes to interfere with an inner surface of the first side flange 230. The first protrusion 511 may have a protruding length longer than that of the second protrusion 512.

A user may first insert the relatively long first protrusion 511 so as to interfere with the inner surface of the first upper flange 220 and rotate the cover member 500 to have the relatively short second protrusion 512 interfere with the inner surface of the first side flange 230.

The first protrusion 511 and the second protrusion 512 are caught by the first upper flange 220 and the first side flange 230 to prevent the cover member 500 from being separated from the door 100 upwards.

In addition, when the cover member 500 is moved to the rear side of the door 100, the first protrusion 511 and the second protrusion 512 may be caused to interfere with the second upper flange 240 and the second side flange 250. With such a configuration, the cover member 500 may be prevented from being separated to the rear side of the door 100. The corner cover portion 510 may be formed to extend in the thickness direction of the door 100 in a substantially columnar shape.

The rear cover portion 520 may include a guide protrusion 522. The guide protrusion 522 may be formed to protrude from the rear cover portion 520 toward the chassis 200. The guide protrusion 522 is inserted into the insertion hole 251 of the second side flange 250 to guide the mounting position of the cover member 500. However, the guide protrusion 522 may be omitted as needed.

The rear cover portion 520 may include a coupling protrusion 523. The coupling protrusion 523 may be formed to protrude from the rear cover portion 520 toward the chassis 200. The coupling protrusion 523 may be inserted into the coupling hole 253 of the second side flange 250. The coupling protrusion 523 is inserted into the coupling hole 253 so that the cover member 500 is stably mounted on the chassis 200. The rear cover portion 520 may have a substantially quadrangular cap shape.

The cover member 500 may include a reinforcing rib 530 formed to support the corner cover portion 510 and the rear cover portion 520. The reinforcing rib 530 may be formed to extend from a connection point of the corner cover portion 510 and the rear cover portion 520 to reinforce the rigidity of the cover member 500. In addition, the reinforcing rib 530 may be inserted into a part of the first incision portion 261 and a part of the second incision portion 262 of the chassis 200 so that the cover member 500 is stably mounted to the chassis 200.

The cover member 500 may include a synthetic resin material. The cover member 500 may be formed by injection molding or die casting.

With such a configuration of the cover member 500, a user may be prevented from being injured by a sharp cross section of the chassis. In addition, the fixing member and the coupling member coupled to the rear surface are covered to provide the rear surface with a neat appearance, thereby improving the aesthetic quality.

Figure 5:
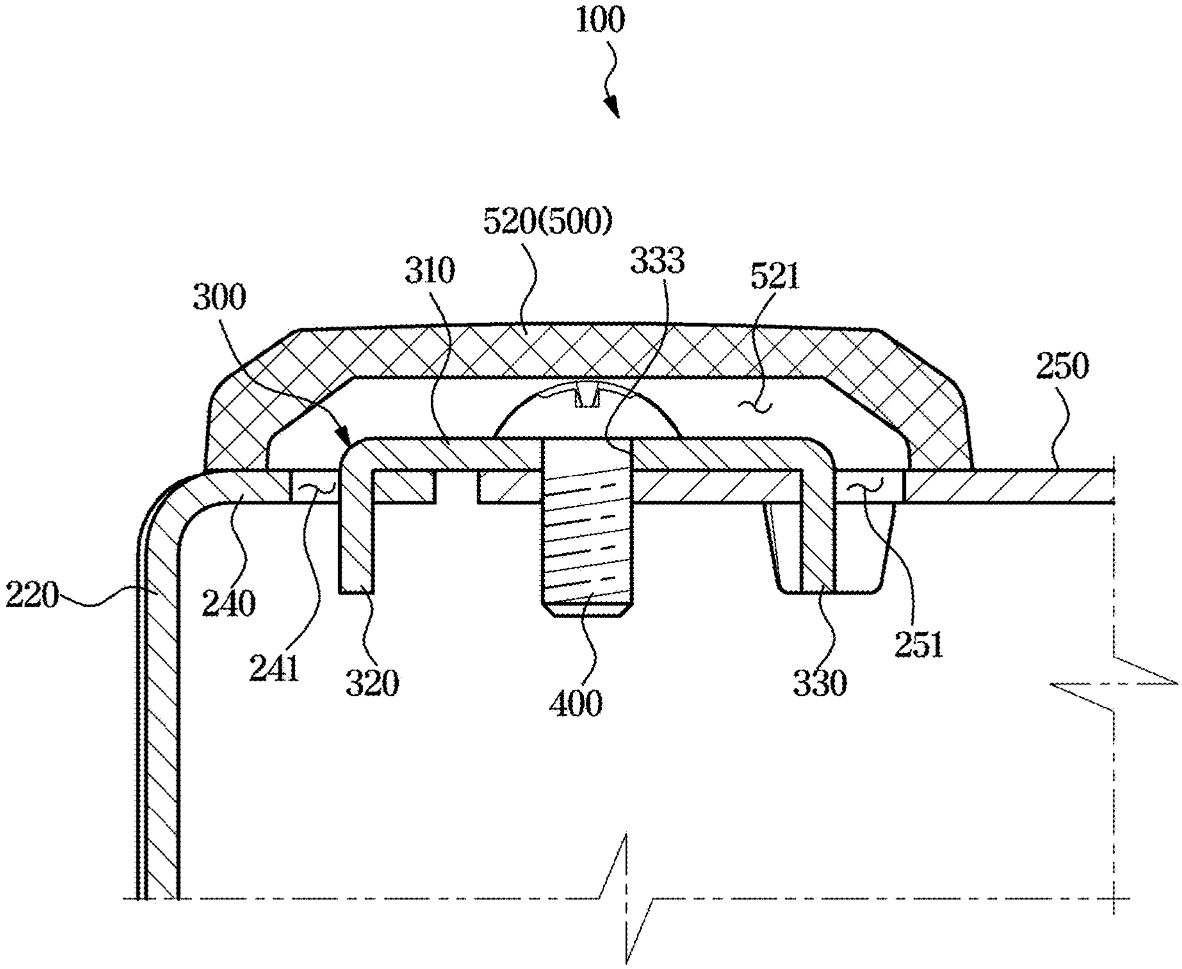
FIG. 5 is a sectional view illustrating a corner of a door according to an embodiment of the disclosure.

FIG. 5 is a sectional view illustrating the corner of the door 100 according to the embodiment of the disclosure.

Referring to FIG. 5, the fixing member 300 may be inserted into the second upper flange 240 and the second side flange 250. The coupling member 400 may be coupled to the fixing member 300 and the second side flange 250. With such a configuration, the fixing member 300 may be fixed to the chassis.

The cover member 500 may cover the fixing member 300 and the coupling member 400. Specifically, the rear cover portion 520 of the cover member 500 may include an accommodation space 521 for accommodating the fixing member 300 and the coupling member 400 therein. The rear cover portion 520 may be bonded to parts of the second upper flange 240 and the second side flange 250.

With such a structure in which the coupling member 400 is not directly coupled to the cover member 500, load or stress concentration acting on the cover member 500 may be minimized. Therefore, durability, such as preventing a crack of the cover member 500, may be secured.

Figure 6:
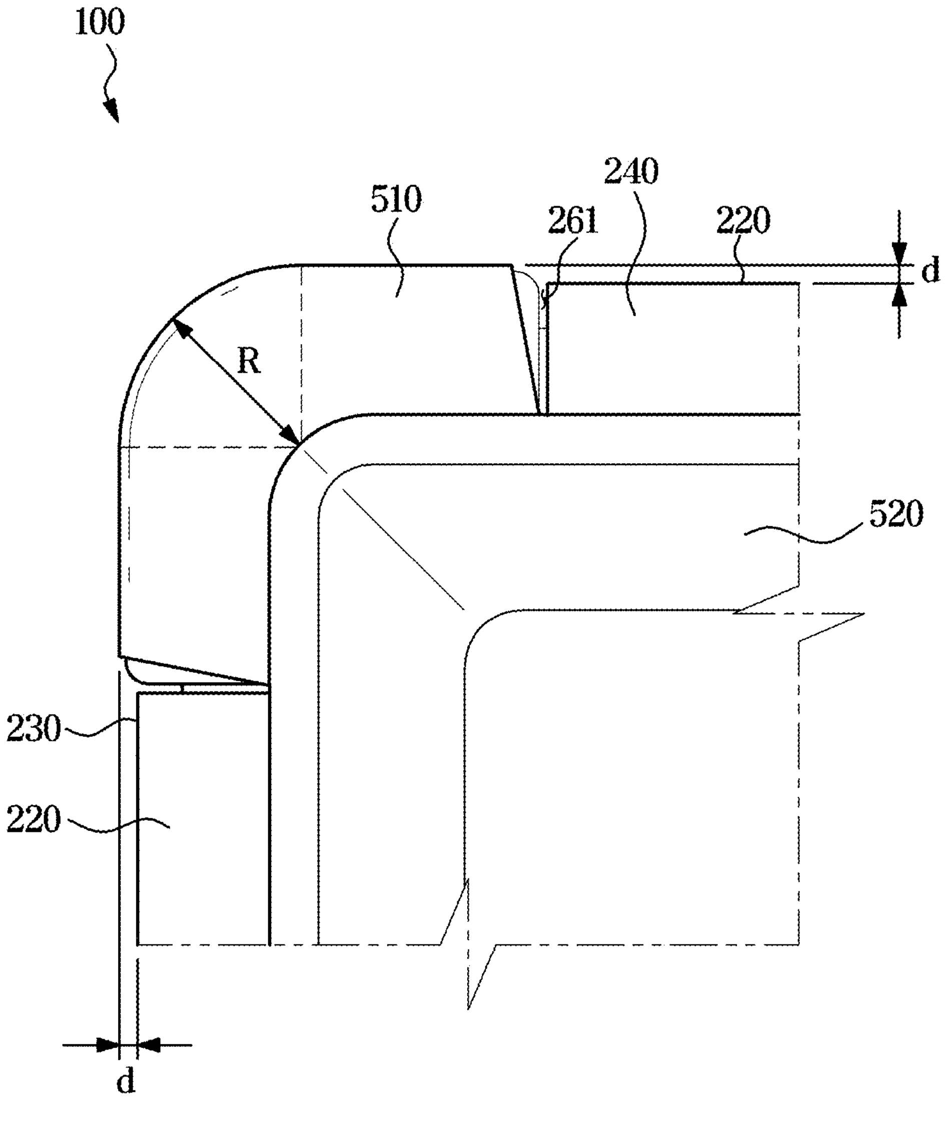
FIG. 6 is a rear view illustrating a corner of a door according to an embodiment of the disclosure.

FIG. 6 is a rear view illustrating a corner of the door 100 according to the embodiment of the disclosure.

Referring to FIG. 6, the corner cover portion 510 of the cover member 500 may be seated on the first incision portion 261 to cover the first incision portion 261. An outer surface of the corner cover portion 510 may protrude a predetermined distance d outward of an outer surface of the first upper flange 220. In addition, the corner cover portion 510 may protrude a predetermined distance d outward of an outer surface of the first side flange 230.

With such a structure, a user may be prevented from being injured by a gap between the shear surface of the chassis 200 and the corner cover portion 510.

The corner cover portion 510 may be formed to have a radius of curvature R such that the corner cover portion 510 forms a corner of the door 100 while covering the first incision portion 261 in a round shape. Without being formed by bending the chassis 200, the corner of the door 100 may be formed have a predetermined radius of curvature R through the structure in which the corner cover portion 510 is seated on the first incision portion 261 of the chassis 200. In addition, the radius of curvature R may be formed to be 2 mm or less. Therefore, the aesthetic quality of the corner of the door 100 may be improved.

Figure 7A:
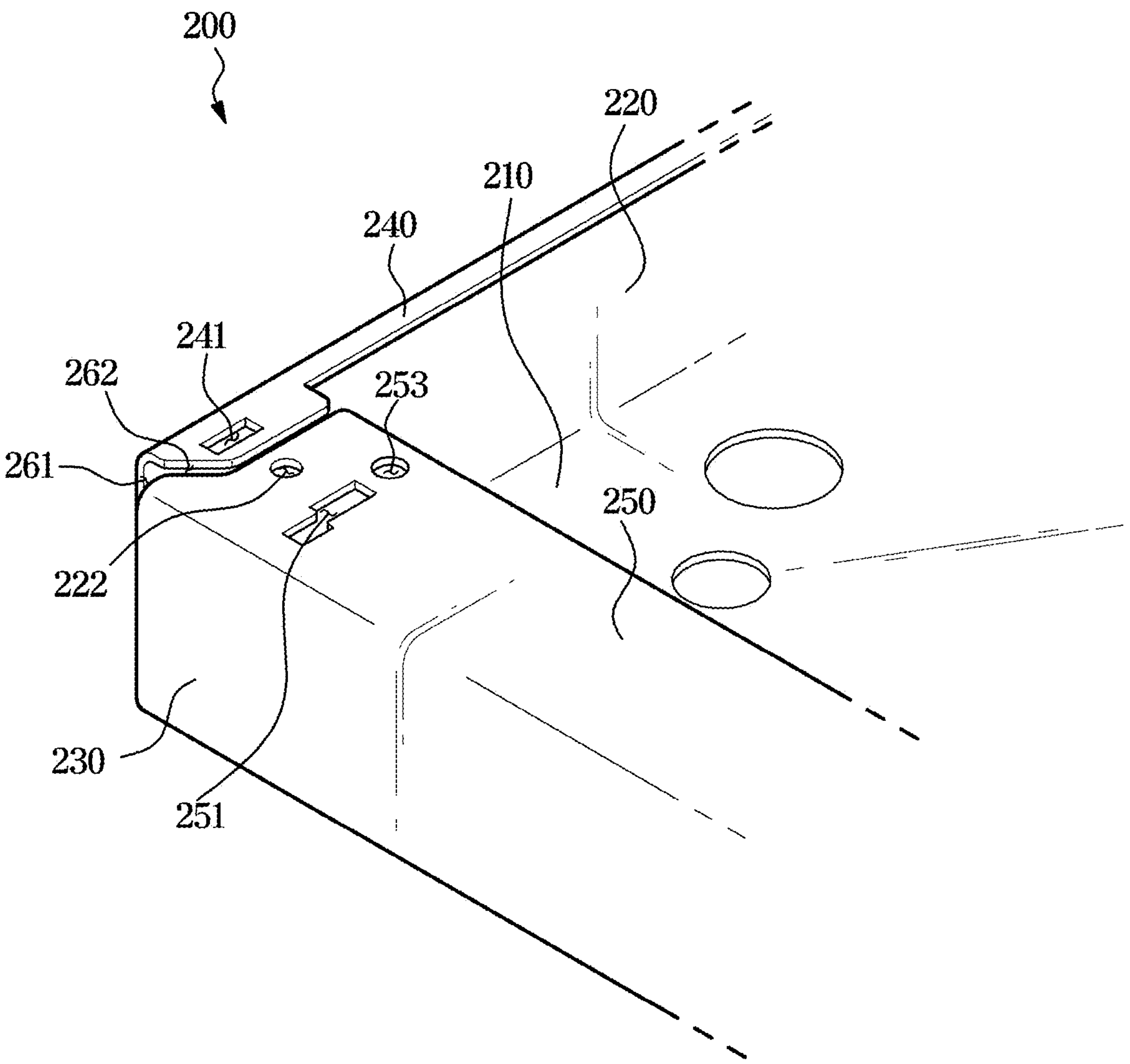
FIG. 7A is a view illustrating a part of a chassis of a door according to an embodiment of the disclosure.
Figure 7B:
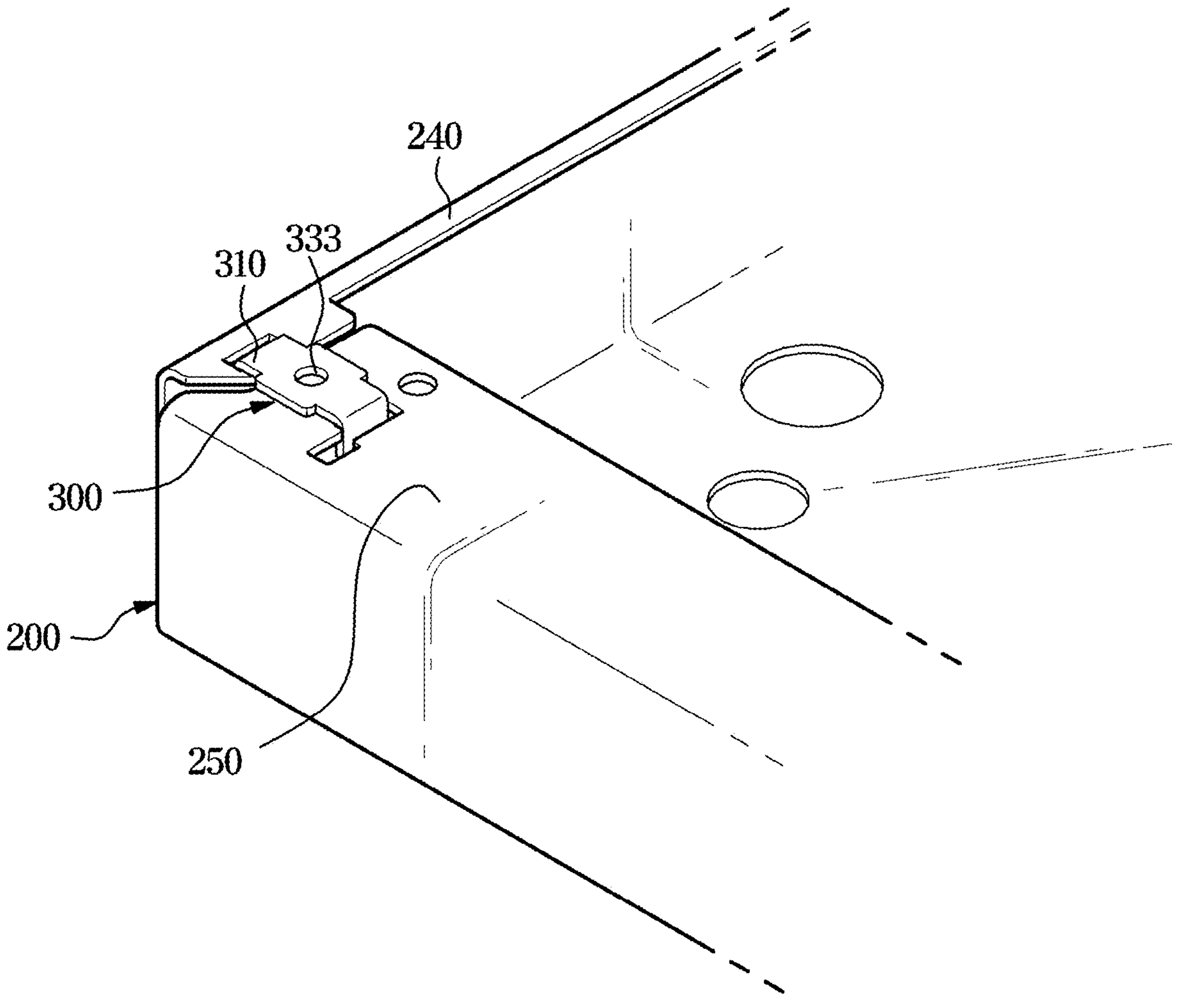
FIG. 7B is a view illustrating a door according to an embodiment of the disclosure, showing a state in which a fixing member is inserted into a chassis.
Figure 7C:
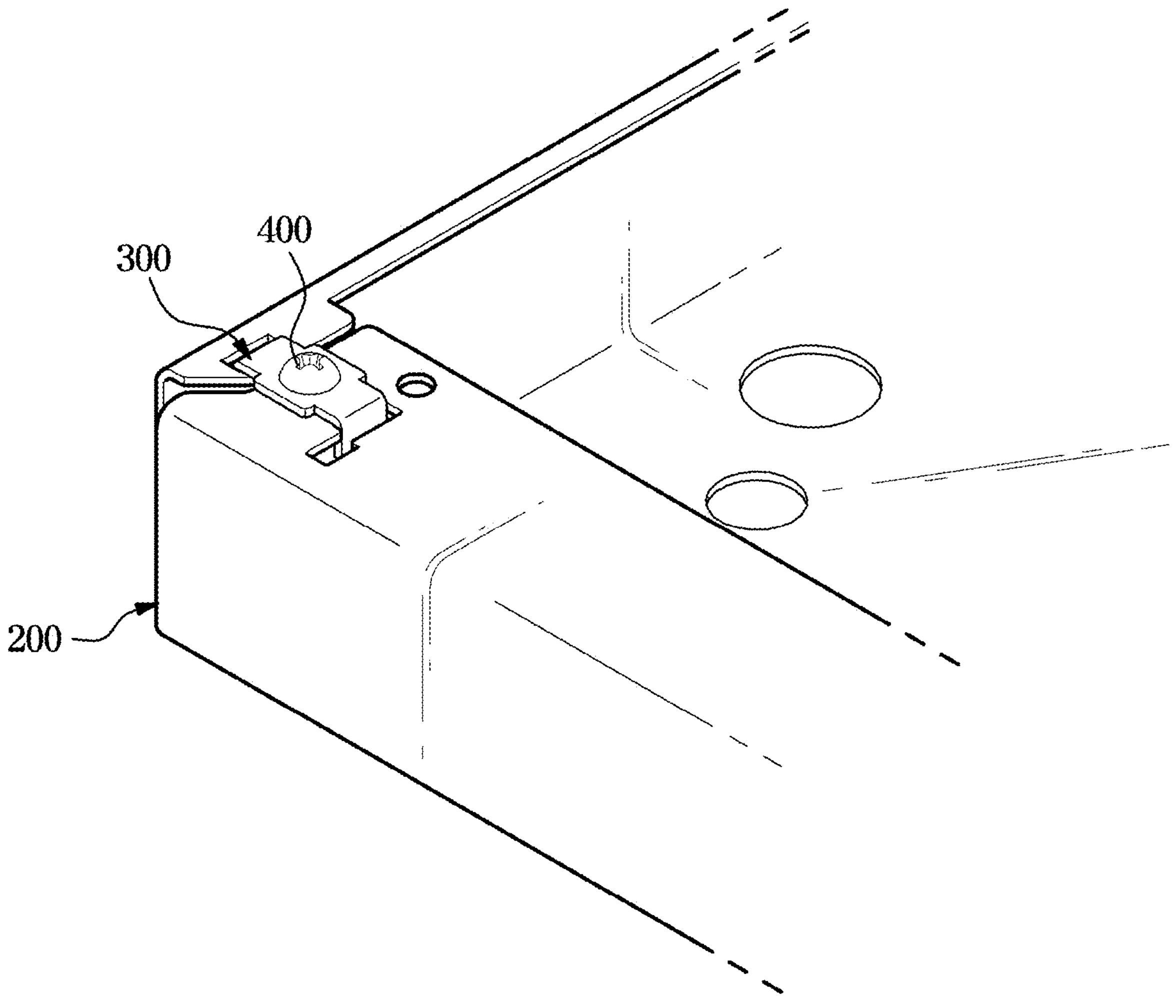
FIG. 7C is a view illustrating a door according to an embodiment of the disclosure, showing a state in which a fixing member is coupled to a chassis.
Figure 7D:
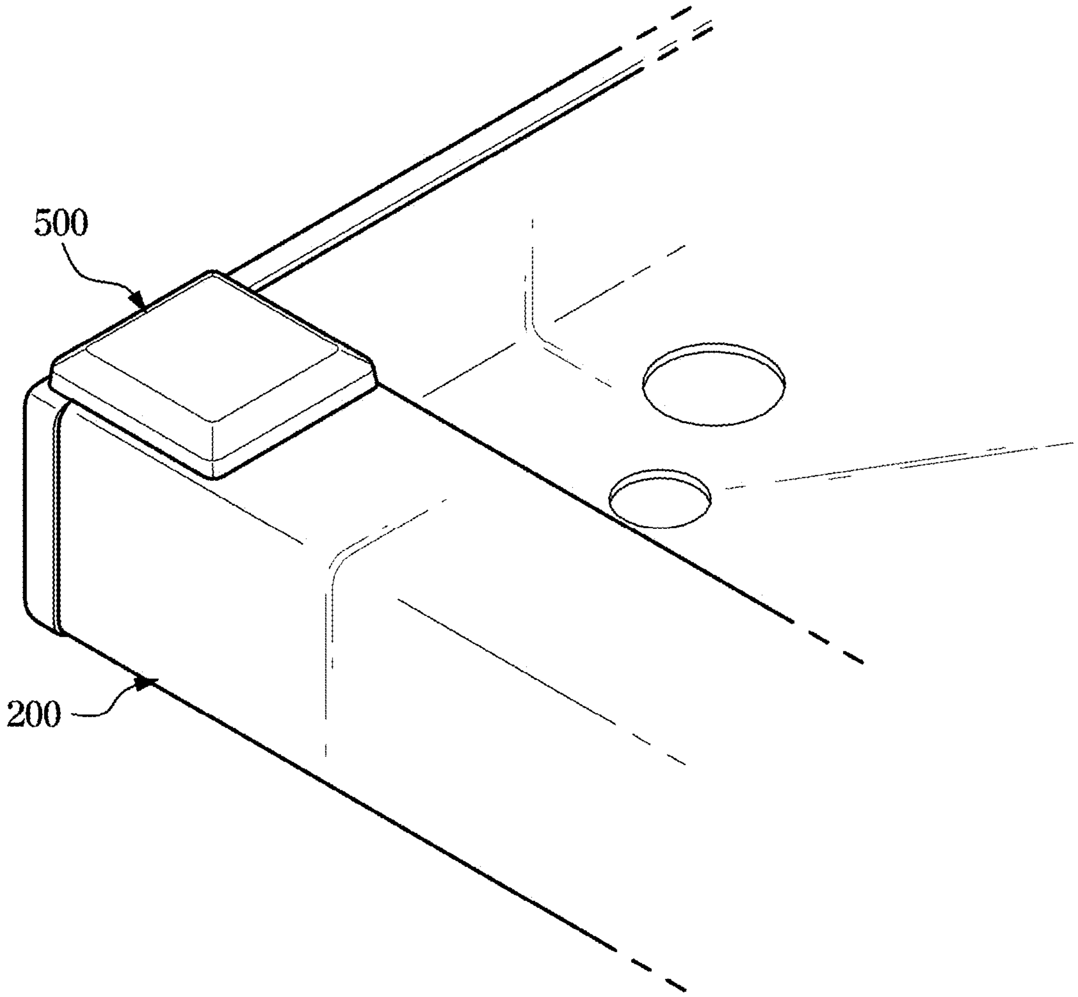
FIG. 7D is a view illustrating a door according to an embodiment of the disclosure, showing a state in which a cover member is coupled to a chassis.

FIG. 7A is a view illustrating a part of the chassis 200 according to the embodiment of the disclosure. FIG. 7B is a view illustrating a state in which the fixing member 300 is inserted into the chassis 200 according to the embodiment of the disclosure. FIG. 7C is a view illustrating a state in which the fixing member 300 is coupled to the chassis 200 according to the embodiment of the disclosure. FIG. 7D is a view illustrating a state in which the cover member 500 is coupled to the chassis 200 according to the embodiment of the disclosure.

The operation of the disclosure will be described with reference to FIGS. 7A to 7D.

Referring to FIG. 7A, the door 100 may include the chassis 200 that forms the external appearance of the front surface, the side surface, and parts of the rear surface of the door 100.

The chassis 200 may include the first upper flange 220 formed from an upper side of the front panel 210 in a bent shape and the second upper flange 240 formed from a lateral side of the front panel 210 in a bent shape. The chassis 200 may include the second upper flange 240 formed from the first upper flange 220 in a bent shape and a second side flange 250 formed from the first side flange 230 in a bent shape.

The second upper flange 240 may include the insertion hole 241 formed to allow the first extending portion 320 of the fixing member 300 to be inserted thereinto. The second side flange 250 may include the insertion hole 251 formed to allow the second extending portion 330 of the fixing member 300 to be inserted thereinto. The insertion hole 251 of the second side flange 250 may be formed to allow the guide protrusion 522 of the cover member 500 to be inserted thereinto. However, the space into which the guide protrusion 522 is inserted may be omitted as needed.

The second side flange 250 may include the second fastening hole 222 formed to allow the coupling member 400 to be coupled thereto. The second side flange 250 may include the coupling hole 253 formed to allow the coupling protrusion 523 of the cover member 500 to be inserted thereinto.

Referring to FIGS. 7B and 7C, the fixing member 300 may be inserted into the chassis 200. Specifically, the first extending portion 320 of the fixing member 300 may be inserted into the insertion hole 241 of the second upper flange 240, and the second extending portion 330 may be inserted into the insertion hole 251 of the second side flange 250. The body 310 of the fixing member 300 may be placed in parallel with each upper side of the second upper flange 240 and the second side flange 250 while in close contact with each upper side of the second upper flange 240 and the second side flange 250.

The body 310 of the fixing member 300 may include the first fastening hole 333. The coupling member 400 may be fastened through the first fastening hole 333 formed in the body 310 and the second fastening hole 222 formed in the second side flange 250. By fastening the coupling member 400, the coupling between the fixing member 300 and the chassis 200 may be secured.

The front panel 210 may be substantially perpendicular to the first upper flange 220, and the first upper flange 220 may substantially perpendicular to the second upper flange 240. The front panel 210 may be substantially perpendicular to the first side flange 230, and the first side flange 230 may be substantially perpendicular to the second side flange 250.

When such an angle is not properly formed in the process, the fixing member 300 may be inserted into the chassis 200 to correct the angle. In addition, the fixing member 300 may prevent the bent shape of the front panel 210 from being deformed by heat or external force. That is, the fixing member 300 serves to maintain the shape of the chassis 200.

Referring to FIGS. 7A and 7D, the chassis 200 may include the incision portion 260 for bending the front panel 210. The incision portion 260 may include the first incision portion 261 and the second incision portion 262. The first incision portion 261 may be formed between the first upper flange 220 and the first side flange 230. The second incision portion 262 may be formed between the second upper flange 240 and the second side flange 250.

The incision portion 260 may allow a sharp cross section of the chassis 200 to be exposed to the outside. The door 100 may include the cover member 500 to cover the sharp cross section of the chassis 200.

The cover member 500 may include the corner cover portion 510 covering the first incision portion 261 and the rear cover portion 520 covering the second incision portion 262. The corner cover portion 510 may be seated on the first incision portion 261 to form a corner of the door 100. The rear cover portion 520 may cover the fixing member 300 and the coupling member 400. The coupling protrusion 523 of the rear cover portion 520 is inserted into the coupling hole 253 of the second side flange 250, and parts of the rear cover portion 520 are bonded and fixed to the second upper flange 240 and the second side flange 250.

The rear cover portion 520 may include the accommodation space 521 for accommodating the fixing member 300 and the coupling member 400 therein.

As described above, the configuration of the fixing member 500 to handle a stress acting on the chassis 200 is separately provided from the configuration of the cover member 50 to cover the cross section of the chassis 200 and the fixing member 300, so that the stress directly acting on the cover member 500 is minimized.

The fixing member 300 may include a steel material on which pressing molding is performable. However, the disclosure is not limited thereto, and the fixing member 300 may include a material having a greater rigidity than a material of the cover member 500.

With such a configuration, the manufacturing of the cover member 500 may be facilitated while improving the durability of the cover member 500.

In addition, with the configuration of the cover member 500, the corner of the door 100 may be formed to have a smooth surface without using welding. Therefore, the manufacturing process of the door 100 may be simplified. In addition, a constant level of quality may be guaranteed and the aesthetic quality of the door 100 may be improved.

As is apparent from the above, the cover member configured to cover the sharp incision portion formed on the chassis of the door can prevent a user from being injured by the sharp incision portion.

The manufacturing process of the door can be simplified by covering the incision portion without welding.

The chassis corner portion of the door is formed to have a small radius, so that the aesthetic quality of the door can be improved.

A stress acting on the cover member is minimized using a separate fixing member, so that the durability of the cover member can be secured.

Although the present disclosure has been described with various embodiments, various changes and modifications may be suggested to one skilled in the art. It is intended that the present disclosure encompass such changes and modifications as fall within the scope of the appended claims.

What is claimed is:

1. A home appliance comprising:

a main body including a chamber; and a door configured to open or close the chamber, wherein the door includes:

a front panel, a plurality of flanges including a first upper flange formed from the front panel in a bent shape to form an upper surface of the door, a second upper flange formed from the first upper flange in a bent shape to form a part of a rear surface of the door and including a first insertion hole, a first side flange formed from the front panel in a bent shape to form a side surface of the door and a second side flange formed from the first side flange in a bent shape to form a part of the rear surface of the door and including a second insertion hole, an incision portion including a first incision portion forming a gap between the first upper flange and the first side flange, and a second incision portion forming a gap between the second upper flange and the second side flange, wherein the first incision portion and the second incision portion are communicated to each other, a fixing member coupled to the second upper flange and the second side flange to prevent the second upper flange from being deformed, wherein extending portions of the fixing member are inserted into the first insertion hole and the second insertion hole, and a cover member configured to cover the incision portion and the fixing member and including:

a corner cover portion disposed between the first upper flange and the first side flange to fill the first incision portion wherein the cover member includes a guide protrusion protruding from the cover member and configured to insert into the second insertion hole.

2. The home appliance of claim 1, wherein the cover member includes:

a rear cover portion provided to cover the second incision portion and the fixing member.

3. The home appliance of claim 2, wherein the corner cover portion includes:

a first protrusion configured to contact an inner surface of the first upper flange; and a second protrusion configured to contact an inner surface of the first side flange.

4. The home appliance of claim 2, wherein the corner cover portion has an outer surface that protrudes beyond an outer surface of the first upper flange and the first side flange.

5. The home appliance of claim 2, wherein the cover member further includes a reinforcing rib formed at a connecting portion between the corner cover portion and the rear cover portion and configured to support the corner cover portion and the rear cover portion.

6. The home appliance of claim 2, wherein:

the rear cover portion includes a coupling protrusion formed to be inserted into the second side flange, and the second side flange further includes a coupling hole formed at a position corresponding to the coupling protrusion.

7. The home appliance of claim 2, wherein the rear cover portion is bonded to parts of the second upper flange and the second side flange.

8. The home appliance of claim 1, wherein the cover member includes an accommodating space in which the fixing member is accommodated.

9. The home appliance of claim 8, wherein:

the fixing member includes steel material, and the cover member includes synthetic resin material.

10. The home appliance of claim 1, wherein:

the fixing member further includes a body formed with a fastening hole; and the extending portions extend in a direction perpendicular to the body.

11. The home appliance of claim 10, wherein:

the fastening hole includes a first fastening hole, and one of the plurality of flanges further includes a second fastening hole at a position corresponding to the first fastening hole.

12. A door used for a home appliance, the door comprising:

a chassis forming a front surface, an upper surface, a side surface, and a part of a rear surface of the door;

an incision portion formed by cutting a corner of the chassis and including a first incision portion forming a gap between the upper surface and the side surface and a second incision portion forming a gap between a part of the rear surface formed from the upper surface in a bent shape and a part of the rear surface formed from the side surface in a bent shape, wherein the first incision portion and the second incision portion are communicated to each other;

a cover member configured to cover the incision portion to prevent the incision portion from being exposed and including a corner cover portion disposed between a first upper flange and a first side flange to fill the first incision portion; and a fixing member covered by the cover member and coupled to the part of the rear surface to prevent the second incision portion from being deformed, the fixing member including material having a rigidity greater than a rigidity of the cover member, wherein extending portions of the fixing member are inserted into insertion holes formed in the part of the rear surface of the door wherein the cover member includes a guide protrusion protruding from the cover member and configured to insert into one of the insertion holes formed in the part of the rear surface of the door.

13. The door of claim 12, wherein:

the fixing member further includes a body having a fastening hole configured to allow the fixing member to be fastened to the part of the rear surface; and the extending portions extended in a direction perpendicular to the body and inserted into the part of the rear surface.

14. The door of claim 12, wherein:

the cover member includes a rear cover portion attached to the part of the rear surface to cover the second incision portion and the fixing member.

15. A door used for a home appliance, the door comprising:

a panel;

a first flange formed from the panel in a bent shape to form a first surface of the door;

a first side flange formed from the panel in a bent shape to form a side surface of the door;

a second flange formed from the first flange in a bent shape to face the panel;

a second side flange formed from the first side flange in a bent shape to face the panel;

an incision portion formed by cutting a corner side for the panel to be bent and including a first incision portion forming a gap between the first flange and the first side flange, and a second incision portion forming a gap between the second flange and the second side flange, wherein the first incision portion and the second incision portion are communicated to each other;

a fixing member configured to be inserted into a first insertion hole of the first side flange and a second insertion hole of the second side flange to prevent the second incision portion from being deformed; and a cover member configured to cover the incision portion and the fixing member and including a corner cover portion disposed between a first upper flange and the first side flange to fill the first incision portion wherein the cover member includes a guide protrusion protruding from the cover member and configured to insert into the second insertion hole.

16. The door of claim 15, wherein the fixing member includes material having a rigidity greater than a rigidity of the cover member.

* * * * *